(12) United States Patent
Schroff et al.

(10) Patent No.: US 9,490,633 B2
(45) Date of Patent: Nov. 8, 2016

(54) ELECTRICAL ENERGY SYSTEM COMPRISING MONITORING BASED ON THE ANALYSIS OF STRUCTURE-BORNE SOUND

(71) Applicant: Robert Bosch GmbH, Stuttgart (DE)

(72) Inventors: Clemens Schroff, Kraichtal (DE); Thorsten Huck, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 14/161,783

(22) Filed: Jan. 23, 2014

(65) Prior Publication Data
US 2014/0203644 A1    Jul. 24, 2014

(30) Foreign Application Priority Data

Jan. 24, 2013   (DE) .................. 10 2013 201 165

(51) Int. Cl.
| | |
|---|---|
| H02J 1/00 | (2006.01) |
| G08C 23/02 | (2006.01) |
| H04B 11/00 | (2006.01) |
| H04Q 9/00 | (2006.01) |
| H04R 1/28 | (2006.01) |
| H02J 7/00 | (2006.01) |

(52) U.S. Cl.
CPC ............ *H02J 1/00* (2013.01); *G08C 23/02* (2013.01); *H04B 11/00* (2013.01); *H04Q 9/00* (2013.01); *H02J 7/0021* (2013.01); *H04Q 2209/30* (2013.01); *Y02T 10/7055* (2013.01); *Y10T 307/50* (2015.04)

(58) Field of Classification Search
CPC ........................................................ H04R 1/28
USPC ........................................................ 307/9.1
See application file for complete search history.

(56) References Cited

U.S. PATENT DOCUMENTS

| | | | | |
|---|---|---|---|---|
| 5,838,231 A | * | 11/1998 | Scherbarth ............. | G08B 29/14 340/515 |
| 2006/0111862 A1 | * | 5/2006 | Otterbach ............. | B60R 21/013 702/98 |

FOREIGN PATENT DOCUMENTS

DE    102007038419    2/2009

* cited by examiner

*Primary Examiner* — Robert Deberandinis
(74) *Attorney, Agent, or Firm* — Michael Best & Friedrich LLP

(57) ABSTRACT

An electrical energy system that is one embodiment includes at least one electrical energy module. The electrical energy module includes a monitoring device disposed within the energy module and a control device. Data can be transmitted between the energy module and the control device by means of structure-borne sound.

11 Claims, 2 Drawing Sheets

ELECTRICAL ENERGY SYSTEM COMPRISING MONITORING BASED ON THE ANALYSIS OF STRUCTURE-BORNE SOUND

BACKGROUND OF THE INVENTION

The invention relates to an electrical system and a method for monitoring an electrical energy system.

In the field of automotive technology, primarily serial interfaces (e.g. SPI, serial peripheral interface) are used for data transmission between logic blocks, which can be embodied as integrated circuits (IC), in control devices. The SPI standard mentioned above by way of example demonstrates a bidirectional data transmission, wherein the interface of a user requires at least three pins/lines. The SPI bus allows a ring or bus topology to be implemented. In addition, serial interfaces in the form of LIN, CAN (Controller Area Network), FlexRay or Ethernet are used for the communication between control devices in the motor vehicle. Depending on the specifications, these can likewise be designed in various topologies.

When using a bus topology, an increasingly deteriorated signal integrity and higher levels of interference (in particular higher emission levels) result due to increasing signal reflections resulting from sub-optimal line matching. In the application employing ring topology, very high latency times sometimes occur which is why this topology cannot be efficiently used. The star topology does indeed provide a good communications channel with low latency, wherein the high degree of pin or cabling complexity does however hamper the use thereof.

A transmission of data via a so-called powerline communications system is furthermore known. Due to the high level of interference, very complex transceivers are required in this case. In order to separate data and energy, cost intensive, passive components (e.g. inductors) are required. Hence, the omission of data lines does not necessarily result in cost reduction and must be evaluated separately for each application.

Crash detection in automobiles is furthermore known on the basis of structure-borne sound measurement. Structure-borne sound sensors can be an integral part of the electronics for activating restraint systems, such as, e.g., air bags and emergency tensioning retractors. By measuring the characteristic structure-borne sound that occurs during a crash, the plastic deformation of the structure is detected. At the same time, different crash scenarios, such as, e.g., high or low speed, partial vehicle overlap, slant collision or collision against easily deformable objects can be distinguished very well.

The German patent application DE 10 2007 038 419 B4 discloses a device and a method for transmitting measurement data, wherein data can be transferred through walls by means of the device and wherein the provision of the data and the transmission thereof outwardly from the interior of the housing and/or in the reverse direction take place by means of acoustic waves.

SUMMARY OF THE INVENTION

According to a first aspect, the invention creates an electrical energy system comprising:
at least one electrical energy module having a monitoring device disposed within the energy module; and
a control device, wherein data can be transmitted between the energy module and the control device by means of structure-borne sound.

According to a second aspect, a method for monitoring an electrical energy system comprising at least one electrical energy module and at least one control device is proposed by the invention, said method comprising the following steps:
ascertaining operating data of the energy module by means of a monitoring device; and
transmitting the operating data between the energy module and the control device by means of structure-borne sound.

A preferred embodiment of the energy system according to the invention is characterized in that the structure-borne sound between the energy module and the control module can be transmitted at least partially via an electrical power line. The electrical power line can be a bus bar, for example a type of metal bracket. This has the advantage that an already available infrastructure in the form of an electrical power line between the energy modules can be used for the transmission of the structure-borne sound. In addition, this substantially rigid connection is well adapted to transmitting structure-borne sound.

A further preferred embodiment of the energy system according to the invention is characterized in that the structure-borne sound can be transmitted at least partially via a housing of the energy module and/or a housing of the control device. This has the advantage of offering an alternative sound path, wherein an existing infrastructure in the form of housings can be used to transmit the structure-borne sound. In this manner, multipath propagations, i.e. propagations via power line and housing, are facilitated.

A further preferred embodiment of the energy system according to the invention is characterized in that one or a plurality of monitoring devices and one or a plurality of control devices are functionally connected to a transceiver for structure-borne sound. A bidirectional communication option for the monitoring device is thereby advantageously created, which besides a connection to the transceiver can be implemented without additional wiring complexity.

A further preferred embodiment of the energy system according to the invention is characterized in that the number of boundary surfaces comprising different materials between the transceivers for structure-borne sound is kept to a minimum. This advantageously brings about a reduced breakdown susceptibility as a result of the number of media being reduced which could distort structure-borne sound signals. The sound path is optimized in this manner by means of a reduced number of media transitions in said sound path.

A further preferred embodiment of the energy system according to the invention is characterized in that the energy system has a damping device for structure-borne sound. This advantageously results in an increase in the interference resistance because external, i.e. brought about outside of the energy system, interferences by means of structure-borne sound have substantially no effect.

A further preferred embodiment of the energy system according to the invention is characterized in that the damping device comprises at least one material which has poor transmission properties for structure-borne sound in a frequency range of the structure-borne sound that is used for structure-borne sound transmission. In this way, the damping property and thus a safety level for the system can be well designed by means of a selection of materials for the damping device.

A further preferred embodiment of the energy system according to the invention is characterized in that the damping device for the most part completely encloses the energy system. This advantageously provides a substantially complete sonic shielding with respect to the environment.

A further preferred embodiment of the energy system according to the invention is characterized in that the monitoring device and the control device are designed as a part of a battery management system. In so doing, the inventive structure-borne sound communication can be used for the needs of a management system for the energy system.

A preferred modification to the method according to the invention provides for a manipulation of the energy module by means of the control device as a function of the operating data of the energy module. In this way, a manipulation of the energy modules can be advantageously carried out at the cell level, whereby an effective monitoring or controlling of the entire energy system is supported.

It is considered particularly advantageous in the case of the present invention that a monitoring device is integrated into an energy module, wherein structure-borne sound is used for a data communication between the individual energy modules and a control device. As a result, no separate wiring that involves corresponding interventions into the energy modules is required for a communication between said devices. An efficient and resource friendly monitoring of each individual cell is thus advantageously facilitated by means of the communication via structure-borne sound.

BRIEF DESCRIPTION OF THE DRAWINGS

Further features and advantages of the present invention are subsequently explained by means of exemplary embodiments referring to the figures. All described or depicted features thereby form by themselves or in any desired combination the subject matter of the invention, independent of the summarization thereof in the patent claims or the back references thereof as well as independent of the formulation or depiction thereof in the description or in the figures. The figures are primarily intended to clarify the principles essential to the invention. In the figures, identical reference numerals refer to elements that are identical or identical in function.

In the drawings.

DETAILED DESCRIPTION

Figure 1:
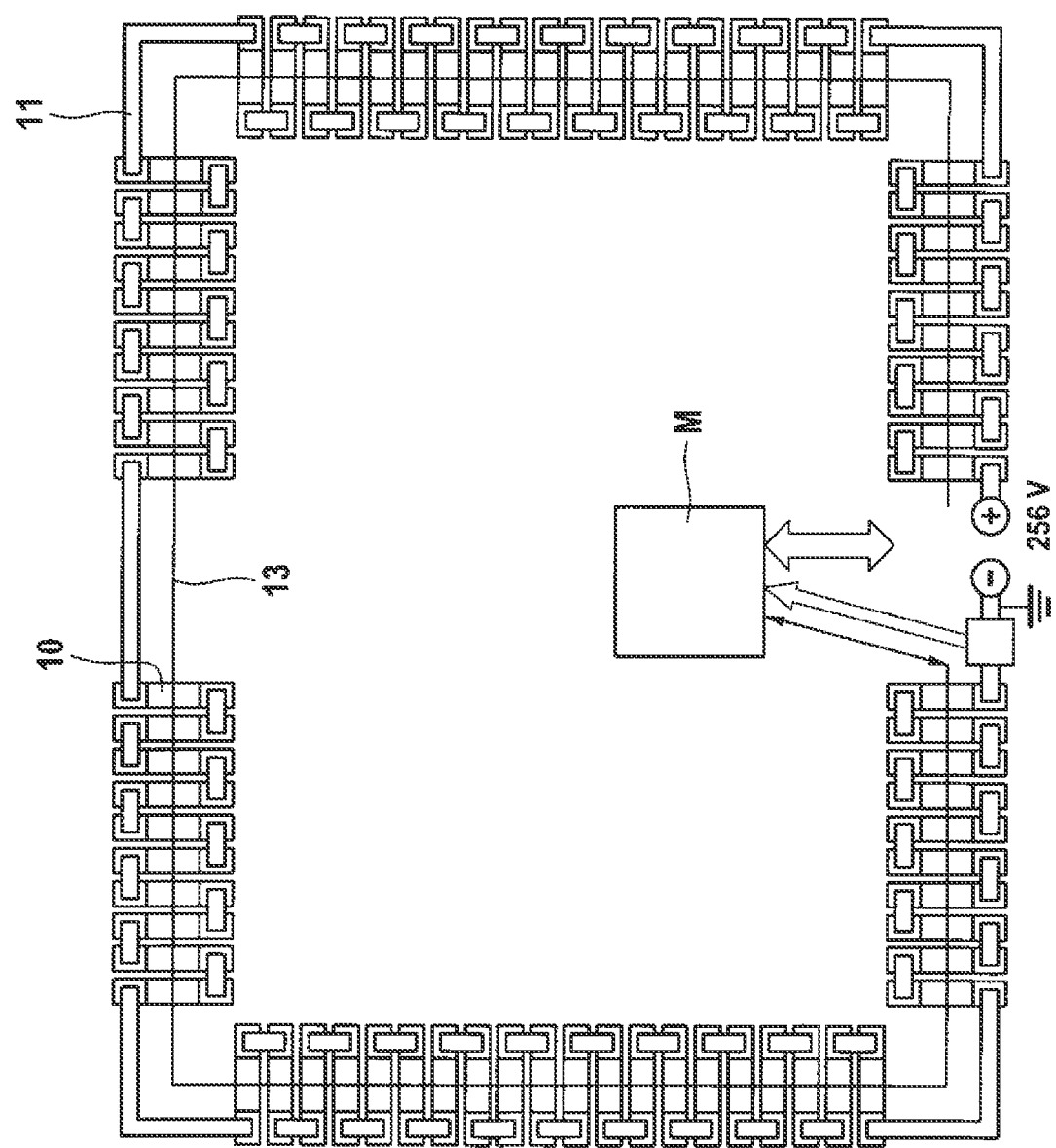
FIG. 1 shows a monitored arrangement of an exemplary energy system.

FIG. 1 shows a principal depiction of a base topology comprising altogether eighty energy modules 10 (e.g. in the form of energy storage cells) which are interconnected electrically in series to each other via an electrical line 11. In this way, an electrical voltage of, for example, 256 V can be tapped between the first and the last energy module 10. A data line 13 (e.g. an RS-485 interface) is provided to enable a serial data communication between each individual energy module 10 and a master device M. In so doing, a dedicated input and output of the data line 13 are required for each individual energy module 10.

According to the invention, provision is now made to replace the communication system or the data line 13 in such a manner that structure-borne sound is used for a data communication between one or a plurality of monitoring devices of the energy cells and a central control device.

Figure 2:
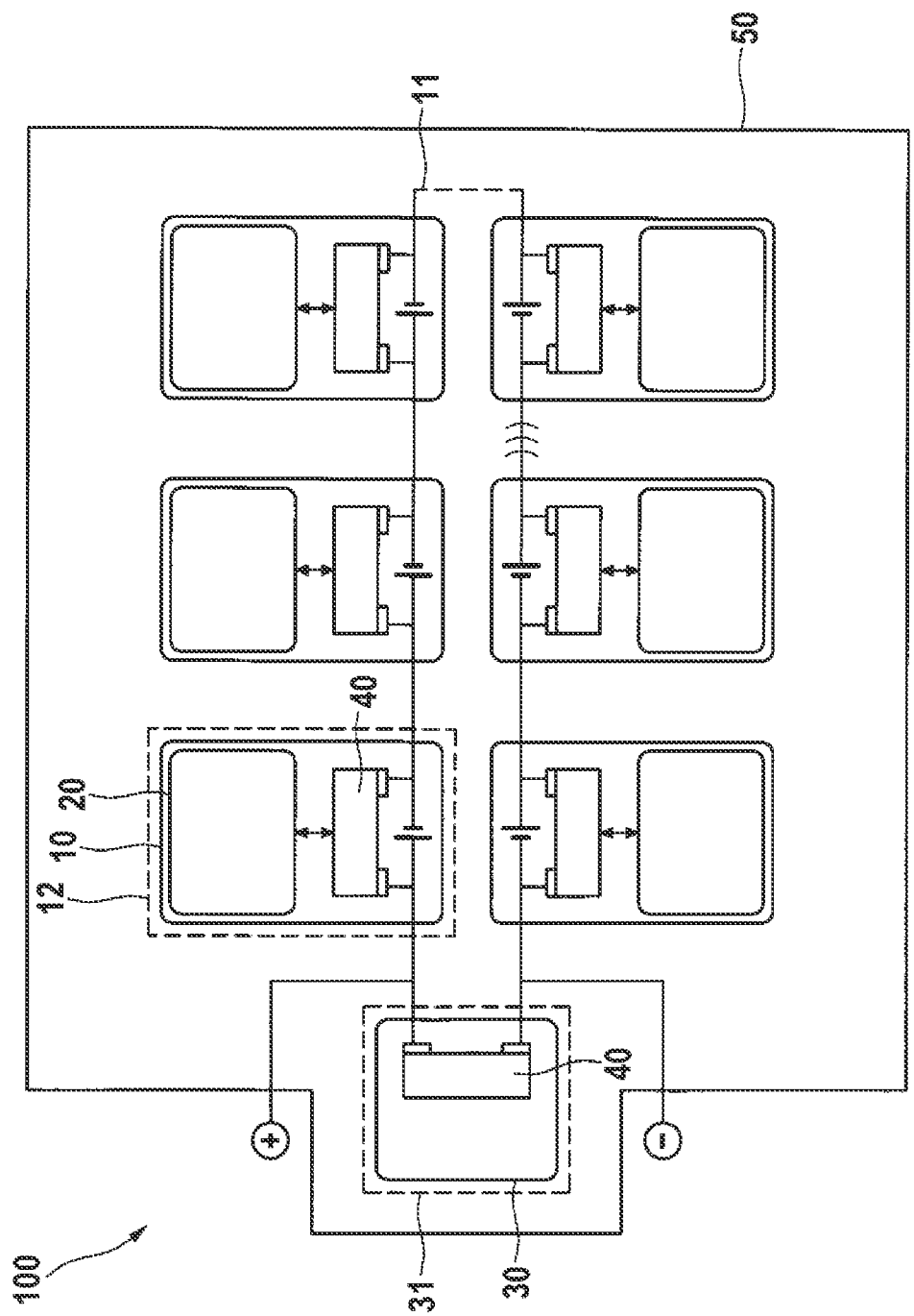
FIG. 2 shows an embodiment of an energy system according to the invention.

FIG. 2 shows a principal depiction of a first embodiment of the energy system 100 according to the invention. The energy system 100 comprises a plurality of energy modules 10 which are electrically interconnected to each other by means of a power line 11 and can, for example, be designed as a battery cell, electrical power generation cell (e.g. fuel cell) or another type of electrical energy store or energy converter.

Each of the electrical energy modules 10 internally comprises a monitoring device 20, which preferably includes a plurality of sensors in order to detect specific physical parameters of the energy module 10, such as, for example, temperature, electrical voltage, electrical current, state of charge, electrical resistance, etc. The monitoring device 20 is functionally connected to a transceiver 40 for structure-borne sound, which is designed as a structure-borne sound transceiver. The transceiver 40 preferably comprises an electrical insulating device vis-B-vis the electrical voltage level of the power line 11. For the sake of better clarity, the reference numerals 10, 12, 20 and 40 are only depicted for a single energy module 10.

The sensors within an energy module 10 can therefore comprise a transmitter and a receiver or a module which combines both functions. Conceivable embodiments could be a piezo element or a MEMS component. The connection of the sensor element of the monitoring device for transmitting the structure-borne sound to the power line 11 and/or to the housing 12 can be implemented by means of an adhesive joint. As an alternative, other familiar methods, such as, e.g., screws, rivets, welding or pressing, are also conceivable.

The transceiver 40 can be installed at any desired position in the energy modules 10. All required modules, such as, e.g., the sensor system, electronic amplifiers, switching devices, microcontrollers, timers, etc. can be implemented as an integrated electronic component, e.g. as a system on chip (SOC).

Structure-borne sound propagates through the structure as an elastic strain wave—dependant on the frequency—at a speed of up to 5 m/ms, so that a structure-borne sound sensor (not depicted) integrated into the transceiver 40 can quickly and precisely transmit cell scenarios even in peripheral energy modules 10 of the energy system 100. In contrast to electromagnetic waves, such as, e.g. light, microwaves, radio waves, etc., structure-borne sound waves can not propagate in a vacuum. Said structure-borne sound waves thus need a transmission medium consisting of moving particles which transmit the waves.

To this end, the individual transceivers 40 of the individual energy modules 10 are connected physically to one another via the electrical power line 11, wherein the power line 11 is connected to a transceiver 40 of a control device 30. In so doing, it is therefore possible that the control device 30 sends via the transceiver 40 thereof an information request to respectively one or a plurality of the energy modules 10, whereupon an answer of the addressed energy module 10 is sent via structure-borne sound to the control unit 30. The values received by the control unit 10 are further processed and analyzed, wherein values of operating parameters of a plurality of electrical energy modules 10 can be also be evaluated in context or comprehensively.

A transmission protocol known from the prior art can be advantageously used for the data transmission, such as, e.g., time or event controlled protocols, CDMA (Code Division Multiple Access), etc.

The control device 30 can manipulate the energy module 10 as a function of the operating data of said energy module 10, whereby, for example, an electrical charge equalization between the energy modules 10 or a bridging of an energy module 10 from a switching network is, for example, enabled by means of a circuitry-wise bridging or bypassing of the energy module 10 in the energy system 100. As a result, a power potential of the individual energy modules 10 can be better utilized and a level of reliability of the energy system 100 can be advantageously increased.

An efficient mode of operation of the inventive energy system 100 is advantageously supported in this way.

According to the invention, it is therefore possible to completely dispose the monitoring devices 20 within the energy module, whereby a separate, additional wiring effort and expense can be saved. By omitting an intervention into the energy modules 10 for the purpose of wiring, an operating reliability of the energy module 10 is advantageously improved. A manufacturing process for a monitored energy module 10 is moreover cost-effectively possible. In addition, a monitoring or controlling of the electrical energy system 100 is advantageously possible at the cell level.

Lithium ion cells for traction batteries offer a good compromise between power, energy density, efficiency and environmental friendliness. This type of batteries can however also be dangerous and problematic due to the harsh demands of the automotive environment. Battery management systems (BMS) are therefore used in order to provide a safe and reliable operation of the lithium ion cells. In so doing, the BMS should monitor and control the charging state of each individual cell.

The previously described data communication between the monitoring devices 20 and the control device 30 can advantageously be designed as a part of a battery management system (BMS) for the energy system 100, whereby a cell monitoring or an equalization of charging states of the individual energy modules 10 can be carried out in an improved manner.

In a further embodiment, it is also conceivable that acoustic signals from the vehicle environment can be detected and evaluated by means of the battery management system. Said acoustic signals can be examined for predetermined patterns.

According to a further embodiment, the battery management system can also be used for diagnostic purposes. The breakdown of a component in the vehicle is often announced in advance by vibrations and abnormal noises. Said vibrations can likewise be detected and evaluated by the receiver of the management system.

In an alternative embodiment of the inventive energy system 100 (not depicted), a transmission path for the structure-borne sound can also be guided via a housing 12 (indicated only for one energy module 10 in FIG. 2) of the energy module 10 as well as via a housing 31 of the control device 30. In this case, physical contact between said housings 12, 31 is required. Provision is also preferably made for the number of media transitions between different materials between a sound source and a sound sink to be as few as possible in order to configure the sound path for the structure-borne sound as homogenously as possible and therefore with low interference.

A damping device 50 is provided as a further variant which, for example, can be disposed for the most part completely around the energy system 100, whereby it is difficult for a potential attacker to cause any disruptions by means of structure-borne sound to or within the energy system 100. It is also possible as an alternative to use damping elements (not depicted) for interference suppression and/or for a connection of sub-networks and/or for a prevention of an undesired propagation of structure-borne sound signals.

The damping device 50 preferably comprises a material which has poor transmission properties in a frequency range of the structure-borne sound used for the structure-borne sound transmission (e.g. foam material or similar damping materials).

In summary, the invention utilizes a communication interface by means of structure-borne sound for the purpose of transmitting data between integrated circuits of electrical energy modules, wherein the energy modules are, for example, provided for use in an energy system of an electric or hybrid motor vehicle. It is thereby advantageous that no separate or additional lines are required for the data communication.

Although the present invention was described with the aid of preferred embodiments, said invention is not limited thereto. The aforementioned materials and topologies are particularly only used by way of example, and the invention is not limited to the examples that were described. It is, for example, also possible to control or to monitor an energy system designed in a matrix-like manner.

The person skilled in the art will also be able to modify or combine the features described in the invention in a suitable manner without deviating from the substance of the invention.

The invention claimed is:

1. An electrical energy system, comprising:
 a housing including:
  a plurality of electrical energy modules having a substantially rigid connection between each of the plurality of electrical energy modules, the plurality of electrical energy modules including a monitoring device disposed within each of the energy module; and
  a control device;
  wherein the plurality of electrical energy modules and the control device are coupled to each other electrically and acoustically and data can be transmitted between the plurality of electrical energy modules and the control device by means of structure-borne sound.

2. The electrical energy system according to claim 1, wherein the structure-borne sound between the plurality of electrical energy module and the control device can be transmitted at least partially via an electrical power line.

3. The electrical energy system according to claim 1, wherein the structure-borne sound can be transmitted via the housing of the plurality of electrical energy module and/or a housing of the control device.

4. The electrical energy system according to claim 1, wherein one or a plurality of monitoring device(s) and one or a plurality of control device(s) are functionally connected to a transceiver for structure-borne sound.

5. The electrical energy system according to claim 4, wherein the number of boundary surfaces comprising different materials between the transceivers is kept to a minimum.

6. The electrical energy system according to claim 1, wherein the energy system comprises a damping device for damping selective structure-borne sound.

7. The electrical energy system according to claim 6, wherein the damping device comprises at least one material which has poor transmission properties in a frequency range of the structure-borne sound used for the structure-borne sound transmission.

8. The electrical energy system according to claim 6, wherein the damping device at least partially encloses the energy system.

9. The electrical energy system according to claim 1, wherein the monitoring device and the control device are designed as a part of a battery management system.

10. A method for monitoring an electrical energy system having a plurality of electrical energy modules and at least one control device, the method comprising:
   ascertaining operating data of the energy module by means of a monitoring device;
   transmitting the operating data between the energy module and the control device by means of structure-borne sound; and
   dampening the structure-borne sound selectively for interference suppression.

11. The method according to claim 10, comprising as an additional step:
   manipulating the energy module by means of the control device as a function of the operating data of the energy module.

* * * * *